(12) United States Patent
Meng

(10) Patent No.: US 6,501,325 B1
(45) Date of Patent: Dec. 31, 2002

(54) LOW VOLTAGE SUPPLY HIGHER EFFICIENCY CROSS-COUPLED HIGH VOLTAGE CHARGE PUMPS

(75) Inventor: Anita Meng, Milpitas, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/764,693

(22) Filed: Jan. 18, 2001

(51) Int. Cl.[7] .............................. G05F 1/10; G05F 3/02
(52) U.S. Cl. ...................................................... 327/536
(58) Field of Search ................................. 327/534–537

(56) References Cited

U.S. PATENT DOCUMENTS

| | | | | | |
|---|---|---|---|---|---|
| 5,943,226 | A | * | 8/1999 | Kim ............................. | 363/60 |
| 6,107,864 | A | * | 8/2000 | Eukushima et al. ......... | 327/536 |
| 6,198,340 | B1 | * | 3/2001 | Ting et al. .................... | 327/536 |
| 6,278,315 | B1 | * | 8/2001 | Kim ............................. | 327/536 |
| 6,404,270 | B1 | | 6/2002 | Meng .......................... | 327/534 |

OTHER PUBLICATIONS

Meng, Anita, "Switched Well Technique for Biasing Cross–Coupled Switches or Drivers", Ser. No. 09/723,494, Filed Nov. 28, 2000.

Meng, Anita, "Bi–Directional Architecture for a High–Voltage Cross–Coupled Charge Pump", Ser. No. 09/828,772, Filed Apr. 9, 2001.

"On–Chip High–Voltage Generation in MNOS Integrated Circuits Using an Improved Voltage Multiplier Technique", IEEE Journal of Solid–State Circuits, vol. SC–11, No. 3, Jun. 1976, pp. 374–378.

"Low Supply Voltage CMOS Charge Pumps", By Jieh–Tsorng Wu et al., 1997 Symposium on VLSI Circuits Digest of Technical Papers, pp. 81–28.

"MOS Charge Pumps for Low–Voltage Operation", By Jieh–Tsorng Wu et al., IEEE Journal of Solid–State Circuits, vol. 33, No. 4, Apr. 1998, pp. 592–597.

"A New Charge Pump Without Degradation in Threshold Voltage Due to Body Effect", By Jongshin Shin, et al., IEEE Journal of Solid–State Circuits, vol. 35, No. 8, Aug. 2000, pp. 1227–1230.

"Floating–Well Charge Pump Circuits for Sub–2.0V Single Power Supply Flash Memories", By Ki–Hwan Choi, 1997 Symposium on VLSI Circuits Digest of Technical Papers, pp. 61–62.

"A Dynamic Analysis of the Dickson Charge Pump Circuit", By Toru Tanzawa et al., IEEE Journal of Solid–State Circuits, Vo. 32, No. 8, Aug. 1997, pp. 1231–1240.

\* cited by examiner

Primary Examiner—Terry D. Cunningham
Assistant Examiner—Quan Tra
(74) Attorney, Agent, or Firm—Christopher P. Maiorana, P.C.

(57) ABSTRACT

An apparatus comprising a number of cross-coupled charge pump stages configured to generate an output voltage in response to (i) a supply voltage, (ii) a first signal, and (iii) a second signal, where the output voltage has a greater magnitude than the supply voltage.

23 Claims, 16 Drawing Sheets

US 6,501,325 B1

LOW VOLTAGE SUPPLY HIGHER EFFICIENCY CROSS-COUPLED HIGH VOLTAGE CHARGE PUMPS

FIELD OF THE INVENTION

The present invention relates to a method and/or architecture for charge pumps generally and, more particularly, to a method and/or architecture for low voltage supply high efficiency cross-coupled high voltage charge pumps.

BACKGROUND OF THE INVENTION

Charge pumps are circuits that pump charge into capacitors to develop an output voltage higher than the supply voltage. High voltage charge pumps provide positive or negative high voltage to program/erase programmable elements such as EEPROM and flash memory, power solid-state particle detectors and photo-multipliers, drive analog switches, etc. Multiple charge pump circuits can be implemented serially to increase the voltages provided. Conventional charge pump circuits include a number of serially connected stages. The stages contain a diode (or transistor configured as a diode) and a capacitor. The stages are driven by a clock signal.

Referring to FIG. 1a, a diagram of a circuit 10 illustrating a conventional charge pump is shown. The circuit 10 illustrates a so-called Dickson charge pump circuit (see J. F. Dickson, "On-Chip High-Voltage Generation in MNOS Integrated Circuits Using an Improved Voltage Multiplier Technique", IEEE J. of Solid-state Cir., vol SC-11, No. 3, June, 1976, pp. 374–378, which is hereby incorporated by reference in its entirety). The circuit 10 includes a number of stages 12a–12n. Each stage 12 contains a diode connected transistor 14 and a capacitor 16.

The circuit 10 can provide a supply voltage minus threshold voltage (Vcc–Vt) increase at each stage. The output voltage Vpp of the circuit 10 can be Vpp=(Vcc–Vt)*n+Vcc. However, the amplitude of clock pulses φa and φb, pump capacitance (Cp), stage parasitic capacitance (Cs), and load current (Io) are factors that can limit the voltage gain achieved at each pump stage.

For charge to be passed fully from a lower stage to a higher stage, the increase in voltage for the stage ΔVstage must be greater than the transistor threshold voltage Vt. The circuit 10 has a number of disadvantages. For example, (i) the diode drop reduces efficiency, (ii) the breakdown voltage of the transistors must increase as charge pump output voltage increases, (iii) extra stages are required due to low efficiency, (iv) an output voltage at least one Vt above the desired output voltage must be developed, and (v) the circuit 10 does not work well at low supply voltage levels.

Referring to FIG. 1b, a diagram of a circuit 20 illustrating another conventional charge pump is shown. A description of the circuit 20 can be found in Jieh-Tsong Wu and Kuen-Long Chang, "MOS Charge Pumps for Low-Voltage Operation", IEEE J. of Solid-state Cir., Vol. 33, No. 4, April, 1998, pp 592–597, which is hereby incorporated by reference in its entirety. The circuit 20 is implemented similarly to the circuit 10 of FIG. 1a. However, to improve low supply voltage performance, each stage 22 of the circuit 20 has an additional transistor 28. The circuit 20 is more efficient than the circuit 10 and eliminates the voltage threshold Vt drop. However, the circuit 20 has disadvantages in that (i) the charge can flow backwards when the clock signals φa and φb transition low at each corresponding stage and (ii) the circuit 20 must develop an output voltage that is at least one Vt higher than the required output voltage Vpp.

Referring to FIG. 1c, a diagram of a circuit 30 illustrating another conventional charge pump circuit is shown. A description of the circuit 30 can be found in Jieh-Tsong Wu and Kuen-Long Chang, "Low Supply Voltage MOS Charge Pumps", 1997 Symposium on VLSI Circuits Digest of Technical Papers, pp 81–82, which is hereby incorporated by reference in its entirety. In order to eliminate the charge backflow problem of the circuit 20 of FIG. 1b, a charge transfer switch circuit 40 is added at each stage 32a–32(n–1). The circuit 30 has an advantage when compared to the circuit 20 that charge is always pumped forward. However, the circuit 30 has the disadvantages of (i) an output voltage that must be at least one Vt above the desired output voltage and (ii) the transistors and capacitors at the stages 32n–1 and 32n must have a high breakdown voltage (breakdown voltage=Vpp+Vt where Vt can be as high as 3V).

It would be desirable to have a charge pump circuit that can efficiently develop a high positive or negative output voltage from a low input voltage without requiring higher breakdown voltage transistors.

SUMMARY OF THE INVENTION

The present invention concerns an apparatus comprising a number of cross-coupled charge pump stages configured to generate an output voltage in response to (i) a supply voltage, (ii) a first signal, and (iii) a second signal, where the output voltage has a greater magnitude than the supply voltage.

The objects, features and advantages of the present invention include providing a method and/or architecture for implementing a low voltage supply higher efficiency cross-coupled high voltage charge pump that may (i) have improved efficiency, (ii) have reduced diode drop, (iii) perform well at low supply voltages, (iv) reduce the need for higher breakdown voltage transistors, (v) require little extra die area, and/or (vi) be easily implemented.

BRIEF DESCRIPTION OF THE DRAWINGS

These and other objects, features and advantages of the present invention will be apparent from the following detailed description and the appended claims and drawings in which:

FIG. 10a is a diagram illustrating example waveforms of the circuits of FIGS. 2a, 5, 7, and 9a;

DETAILED DESCRIPTION OF THE PREFERRED EMBODIMENTS

Figure 1A:
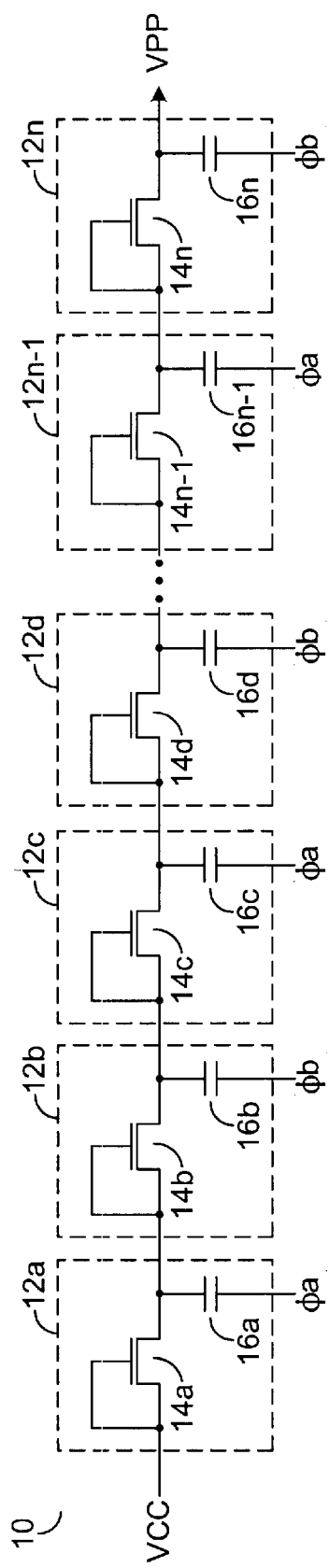
FIGS. 1(a–c) are diagrams illustrating conventional high voltage charge pump circuits.
Figure 1B:
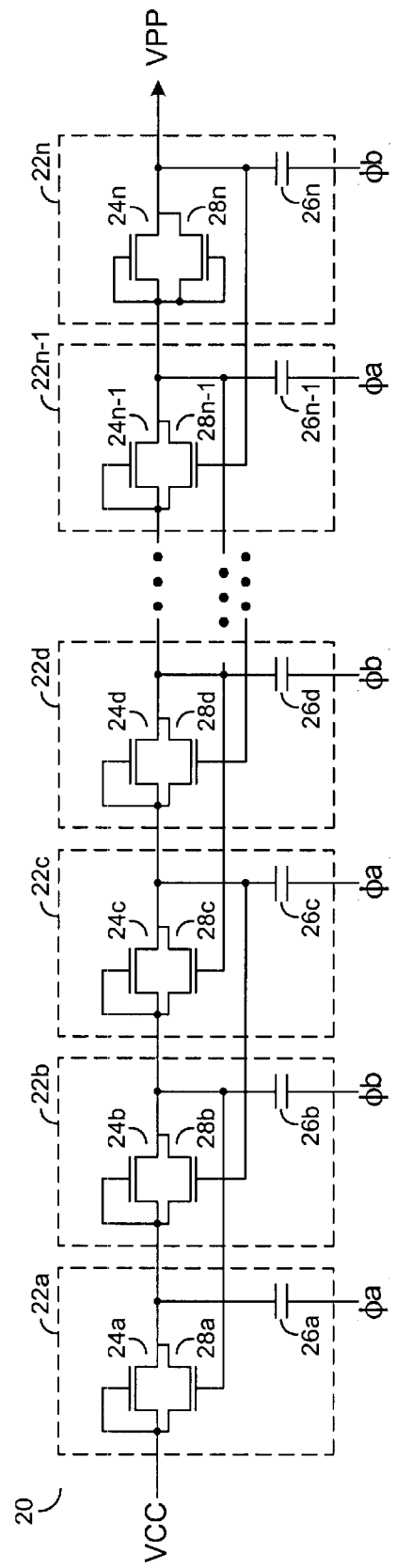
Figure 1C:
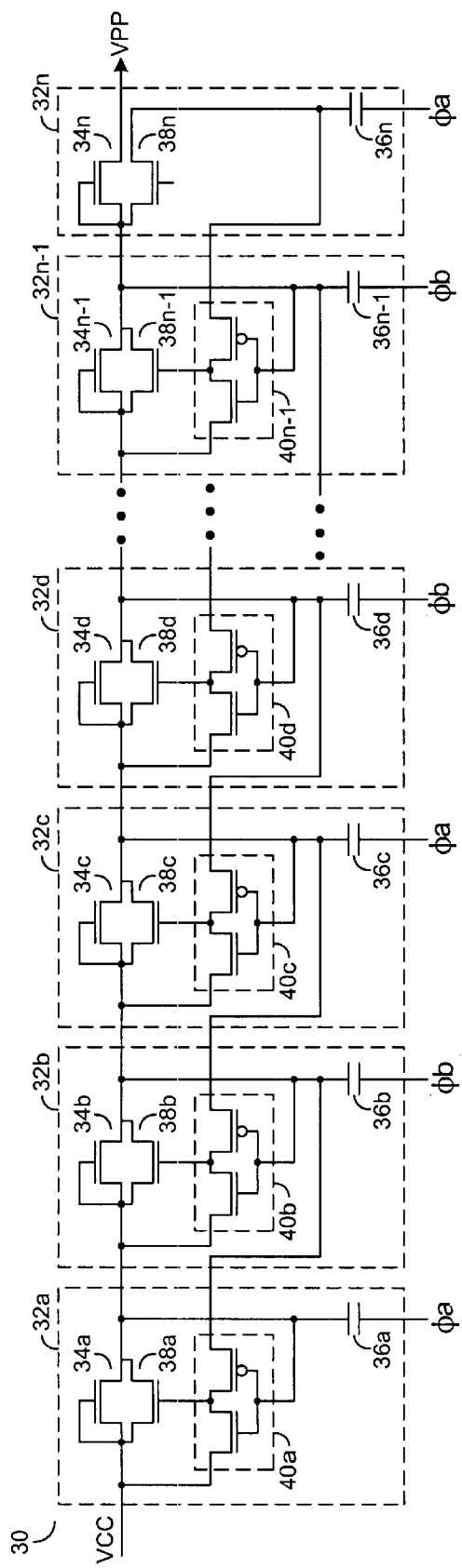
Figure 2A:
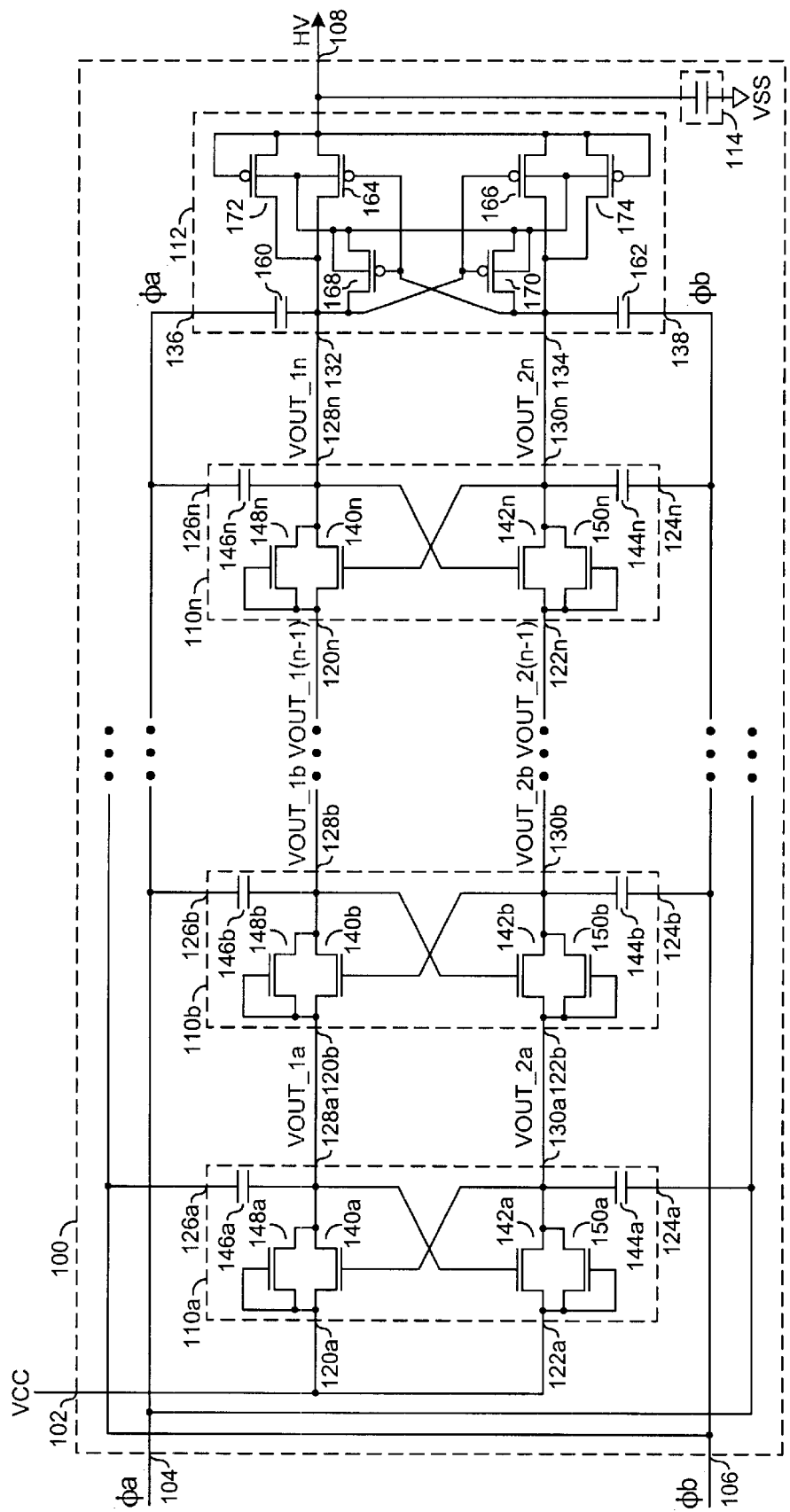
FIG. 2a is a diagram illustrating a preferred embodiment of the present invention.

Referring to FIG. 2a, a diagram of a circuit 100 illustrating a preferred embodiment of the present invention is shown. The circuit 100 may be implemented, in one example, as a low voltage supply, higher efficiency, cross-coupled high voltage charge pump circuit. The circuit 100 may have an input 102 that may receive a supply voltage (e.g., Vcc, $V_{DD}$, etc.), an input 104 that may receive a signal (e.g., φa), an input 106 that may receive a signal (e.g., φb), and an output 108 that may present a signal (e.g., HV). The signals φa and φb may be, in one example, non-overlapping complementary clock signals (described in more detail in connection with FIGS. 10a–10b). The amplitude of the signals φa and φb may be similar to the amplitude of the supply voltage Vcc (e.g., the signals φa and φb may swing from one rail to the other). In one example, the signal HV may be a high voltage output. The circuit 100 may be configured to generate the signal HV in response to the supply voltage Vcc and the clock signals φa and φb.

The circuit 100 may comprise a number of stages (or circuits) 110a–110n, a block (or circuit) 112, and a block (or circuit) 114. The stages 110a–110n may comprise cross-coupled charge pump pairs. The circuit 112 may be an output driver circuit. The circuit 114 may be a load. In one example, the circuit 114 may comprise a capacitance coupled between the signal HV and a power supply ground (e.g., Vss).

Where stage 110i is any one of the stages 110a–110n, the stage 110i may have an input 120i that may receive a signal (e.g., VOUT_1(i–1)), an input 122i that may receive a signal (e.g., VOUT_2(i–1)), an input 124i that may receive one of the signals φa and φb, an input 126i that may receive the other of the signals φa and φb not presented to the input 124i, an output 128i that may present a signal (e.g., VOUT_1i), and an output 130i that may present a signal (e.g., VOUT_2i). The signals φa and φb may be presented alternately to the inputs 124 and 126 of the stages 110a–110n (e.g., the inputs 124a, 124c, 124e, etc., and the inputs 126b, 126d, 126f, etc., may receive the signal φa, and the inputs 124b, 124d, 124f, etc., and the inputs 126a, 126c, 126e, etc., may receive the signal φb). Alternatively, the signals φa and φb may be interchanged. The stage 110a may have an input 120a and an input 122a that may receive the supply voltage Vcc. The voltage of the output signals VOUT_1n and VOUT_2n will generally be approximately Vcc*(n+1), where n is the number of stages 110 in the circuit 100. Alternatively, the voltages VOUT_1i and VOUT_2i may be approximated with losses as (Vcc*(Cpump/(Cpump+Cpara))–Iload/(f*(Cpump+Cpara))), where Cpump=pump stage 110 capacitance, Cpara=total parasitic capacitance at each pump stage 110, Iload=output load current (leakage current), and f=the frequency of the clock signals φa and φb.

The circuit 112 may have an input 132 that may receive the signal VOUT_1n, an input 134 that may receive the signal VOUT_2n, an input 136 that may receive the signal φa, an input 138 that may receive the signal φb, and an output that may present the signal HV. The circuit 112 may be implemented, in one example, as a switched well biased cross-coupled driver. A description of such a driver may be found in co-pending application U.S. Ser. No. 09/723,494, filed Nov. 28, 2000, which is hereby incorporated by reference in its entirety. However, the circuit 112 may be implemented as any suitable driver circuit (e.g., a bootstrapped driver circuit, etc.). The signal HV may be presented to a first terminal of the load 114. A second terminal of the load 114 may be connected to the supply ground Vss.

In a preferred embodiment, each stage (or circuit) 110 may comprise a transistor 140, a transistor 142, a device 144, a device 146, a transistor 148, and a transistor 150. The transistors 140, 142, 148, and 150 may be implemented as one or more NMOS transistors. When the stages 110a–110n are implemented with NMOS transistors, the circuit 112 may be implemented with PMOS drive transistors and the circuit 100 may generate a high positive voltage.

The transistors 140i and 142i may be cross-coupled (e.g., a gate of one transistor is connected to a drain of the other transistor). The devices 144i and 146i may be implemented, in one example, as capacitors. Alternatively, the devices 144i and 146i may be implemented as transistors configured as capacitors. The signal VOUT_1(i–1) may be presented to a source of the transistor 140i. The signal VOUT_2(i–1) may be presented to a source of the transistor 142i. The signal φb may be presented to a first terminal of the device 144i. A second terminal of the device 144i may be coupled to a gate of the transistor 140i and a drain of the transistor 142i. The signal VOUT_2i may be presented at a node formed by the connection of the second terminal of the device 144i, the gate of the transistor 140i, and the drain of the transistor 142i. The signal φa may be presented to a first terminal of the device 146i. A second terminal of the device 146i may be coupled to a gate of the transistor 142i and a drain of the transistor 140i.

The signal VOUT_1i may be presented at a node formed by the connection of the second terminal of the device 146i, the gate of the transistor 142i, and the drain of the transistor 140i. A gate and a source of the transistors 148i and 150i may be coupled to the source of the transistors 140i and 142i, respectively. Drains of the transistors 148i and 150i may be coupled to the drains of the transistors 140i and 142i, respectively. The transistors 148i and 150i may be configured as diodes. The transistors 148i and 150i may be sized smaller than the transistors 140i and 142i. For example, the transistors 148i and 150i may have a width 25% to 33% of the width of the transistors 140i and 142i. The transistors 148i and 150i may be configured to (i) set up the initial conditions and (ii) provide a final discharge path of the circuit 110i.

In one embodiment, the circuit 112 may comprise a device 160, a device 162, a transistor 164, a transistor 166, a transistor 168, a transistor 170, a transistor 172, and a transistor 174. The devices 160 and 162 may be capacitors. In another example, the devices 160 and 162 may be transistors configured as capacitors. The transistors 164, 166, 168, 170, 172, and 174 may be implemented as one or more PMOS transistors. The transistors 164 and 166 may be configured as cross-coupled output drivers. The transistors 168 and 170 may be configured to provide N-well biasing to the transistors 164, 166, 172 and 174. The transistors 168 and 170 may be sized smaller than the transistors 164 and 166. In one example, the transistors 168 and 170 may be in the range of 20% to 40% as large as the transistors 164 and 166. The transistors 172 and 174 may be configured as diodes. The transistors 172 and 174 may be sized smaller than the transistors 164 and 166. For example, the transistors 172 and 174 may have a width 25% to 33% of the width of the transistors 164 and 166. The transistors 172 and 174 may be configured to (i) set up the initial conditions and (ii) provide a final discharge path of the circuit 112.

The device 160 may have a first terminal that may receive the signal φa and a second terminal that may be connected to a node formed by the connection of a source of the transistor 164, a gate of the transistor 166, a source of the transistor 168, a gate of the transistor 170, and a source of the transistor 172. The signal VOUT_1n may be presented to the source of the transistor 164. The device 162 may have a first terminal that may receive the signal φb and a second terminal that may be connected to a node formed by the connection of a gate of the transistor 164, a source of the transistor 166, a gate of the transistor 168, a source of the transistor 170, and a source of the transistor 174. The signal VOUT_2n may be presented to the source of the transistor 166. A node may be formed by the connection of N-wells of the transistors 164, 166, 168, 170, 172, 174, a drain of the transistor 168, and a drain of the transistor 170. The signal HV may be presented at a node formed by the connection of a drain of the transistor 164, a drain of the transistor 166, a gate and a drain of the transistor 172, and a gate and a drain of the transistor 174.

During an example operation of the circuit 100, the transistors 148a–148n and 150a–150n may provide an initial bias to the transistors 140a–140n and 142a–142n (e.g., set up the circuit 100). When the circuit 100 has reached initial set up (e.g., the transistors 148a–148n and 150a–150n may be reverse biased/turned off), the transistors 140a–140n and 142a–142n may be switched on and off every cycle of the clock signals φa and φb.

At the stage 110i, when the signal φa is HIGH, the transistor 142i may be turned on and the transistor 142(i+1) may be turned off. The signal φb may be LOW and the transistor 140i may also be turned off. The charge on the second terminal of the device 144i (e.g., the signal VOUT_2i) may be pumped to the next input signal VOUT_2(i+1). After several cycles of the clock signals φa and φb, the amplitude of the signal VOUT_2i may be approximately Vcc*(i+1) minus losses. Similarly, when the signal φb is HIGH, the transistor 1401 may be turned on and the transistor 140(i+1) may be turned off. The signal φa may be LOW and the transistor 142i may also be turned off. The charge on the second terminal of the device 146i (e.g., the signal VOUT_1i) may be pumped to the input signal VOUT_1(i+1). After several cycles of the clock signals φa and φb, the amplitude of the signal VOUT_1i may be approximately Vcc*(i+1) minus losses. At the stage 110n, the amplitude of the signals VOUT_1n and VOUT_2n may be approximately Vcc*(n+1) minus losses. When the circuit 100 is turned off, the transistors 148a–148n, 150a–150n, 172 and 174 may provide a discharge path for residual charge of the circuits 100a–110n.

When the circuit 112 has reached the initial set up condition (e.g., the transistors 172 and 174 may be reverse biased/turned off) and the stages 110 function as described above, the circuit (output stage) 112 may function as described in co-pending application U.S. Ser. No. 09/723,494, filed Nov. 28, 2000, which is hereby incorporated by reference in its entirety. When the circuit 100 is turned off, the transistors 172 and 174 may provide a discharge path for residual charge of the circuit 112.

Figure 2B:
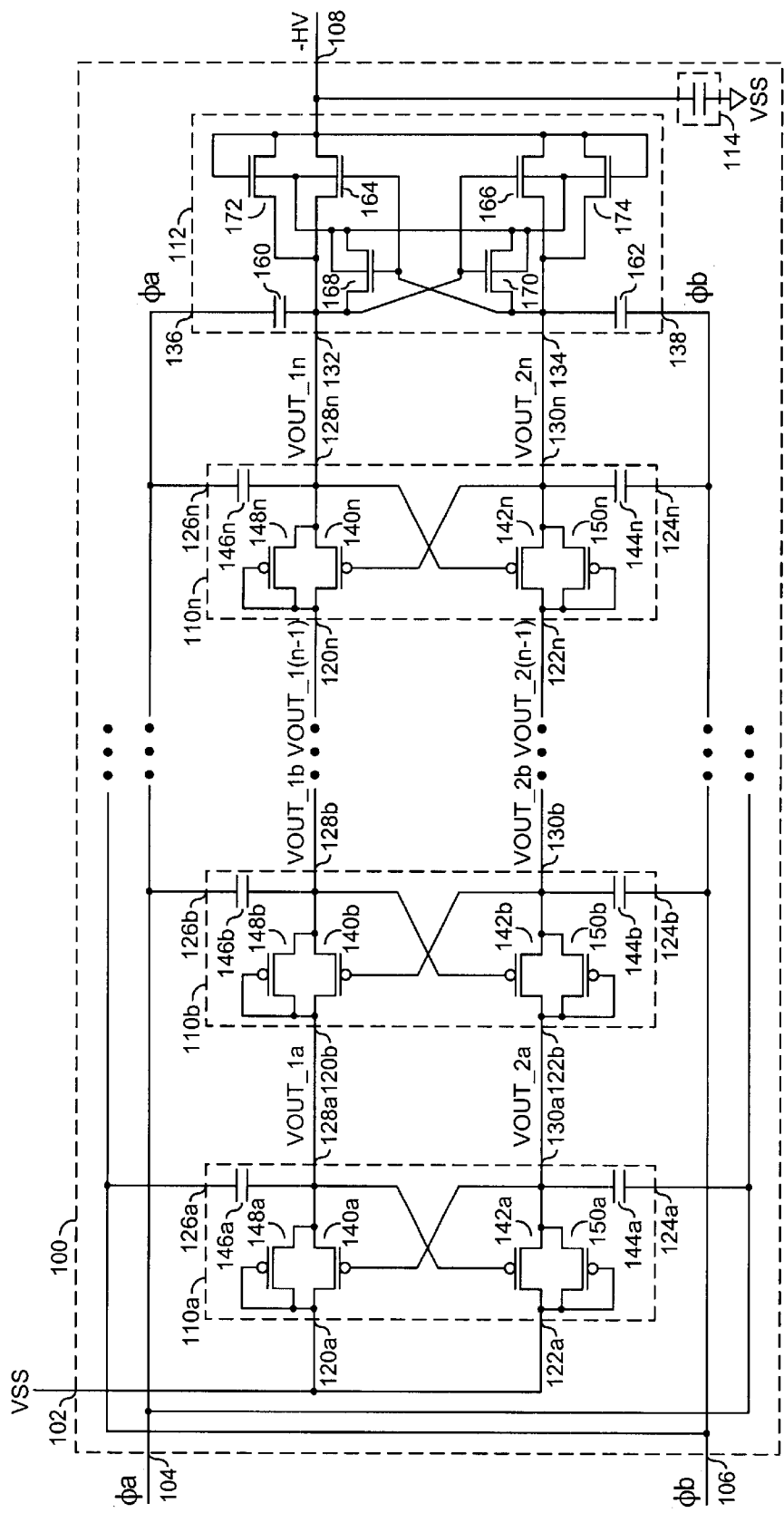
FIG. 2b is a diagram illustrating an alternative embodiment of the present invention.

Referring to FIG. 2b, a PMOS transistor embodiment of the stages 110a–110n and an NMOS transistor embodiment of the circuit 112 is shown. The transistors 140a–140n, 142a–142n, 148a–148n, and 150a–150n may be implemented as one or more PMOS transistors. When the circuit 100 is implemented with the stages 110a–110n using PMOS transistors, the circuit 100 may (i) be connected to Vss at the input 102 and (ii) generate a high negative voltage output (e.g., –HV).

Figure 3:
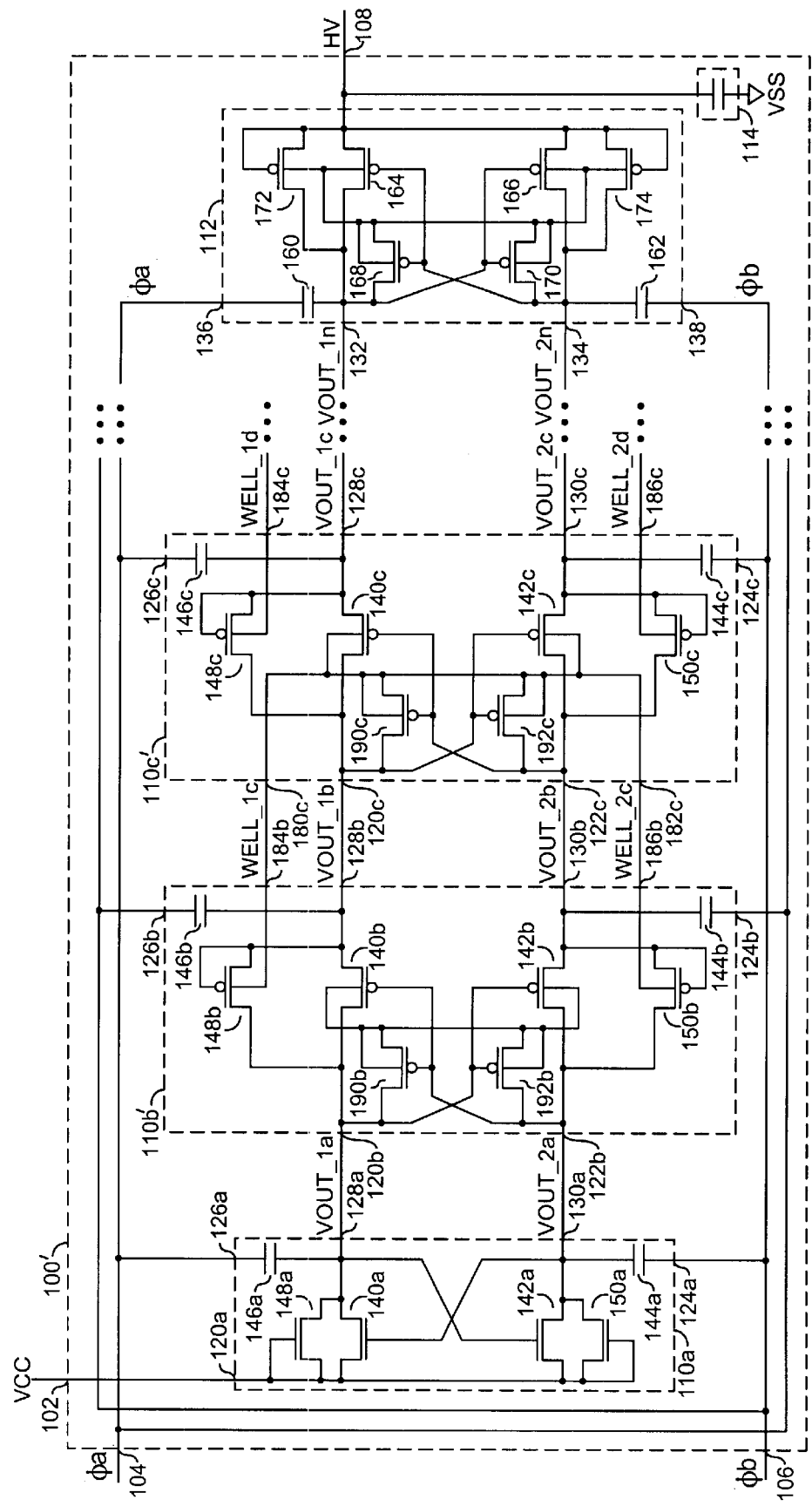
FIG. 3 is a diagram illustrating another alternative embodiment of the present invention.

Referring to FIG. 3, a circuit 100' illustrating an alternative embodiment of the circuit 100 of FIG. 2b is shown. In one example, the circuit 100 may comprise the circuit 110a, a number of circuits 110'b–110'n, the circuit 112, and the circuit 114. The circuit 100' may be implemented similarly to the circuit 100. In one example, the circuit 100' may comprise a cross-coupled PMOS charge pump with N-well biasing. The first stage 110a may not require N-well biasing. The stage 110a may be implemented using NMOS transistors similar to the circuit 110a shown in FIG. 2a. The P-substrates of the transistors 140a, 142a, 148a, and 150a may be connected to the supply ground Vss (not shown). The output circuit 112 may be implemented using PMOS transistors as shown in FIG. 2a. The circuits 110'c–110'n may have an output 180 that may present a signal (e.g., WELL_1c–WELL_1n) and an output 182 that may present a signal (e.g., WELL_2c–WELL_2n). The circuits 110'b–110'(n–1) may have an input 184 that may receive the signal WELL_1c–WELL_1n and an input 186 that may receive the signal WELL_2c–WELL_2n. The signals WELL_1c–WELL_1n and WELL_2c–WELL_2n may be N-well bias signals.

Each of the circuits 110'b–110'n may comprise, in one example, a transistor 190 and a transistor 192. Where a stage 110'i is any one of the stages 110'b–110'n, at the stage 110'i the transistors 190i and 192i may be configured to generate N-well biasing (e.g., the signals WELL_1i and WELL_2i) to the transistors 148(i–1), 150(i–1), 140i and 142i. The transistors 190 and 192 may be smaller than the transistors 140 and 142. In one example, the transistors 190 and 192 may be in the range of 20% to 40% as large as the transistors 140 and 142.

The signal VOUT_1(i–1) may be presented to a node formed by the connection of a source of the transistor 140i, a gate of the transistor 142i, a source of the transistor 148i, a source of the transistor 190i, and a gate of the transistor 192i. The signal VOUT_2(i–1) may be presented to a node formed by the connection of a gate of the transistor 140i, a source of the transistor 142i, a source of the transistor 150i, a gate of the transistor 190i, and a source of the transistor 192i. The signals WELL_1i and WELL_2i may be presented to a node formed by the connection of an N-well of the transistor 148(i–1), an N-well of the transistor 150(i–1), an N-well of the transistor 140i, an N-well of the transistor 142i, an N-well and a drain of the transistor 190i, and an N-well and a drain of the transistor 192i. The signal VOUT_1i may be presented at a node formed by the connection of a drain of the transistor 140i, the second terminal of the device 146i, and a gate and a drain of the transistor 148i. The signal VOUT_2i may be presented at a node formed by the connection of a drain of the transistor 142i, the second terminal of the device 144i, and a gate and a drain of the transistor 150i. The signals WELL_1i and WELL_2i may bias the N-wells of the transistors 148(i–1), 150(i–1), 140i, 142i, 190i and 192i to the higher voltage VOUT_1(i–1) and VOUT_2(i–1) of the stage 110' (i–1).

During an example operation, the circuit 100' may operate similarly to the circuit 100 as shown in FIG. 2b. However, the N-well biasing of the circuit 100' may reduce (i) the body effect between the circuits 110'b–110'n and (ii) the threshold voltage (e.g., Vt) at the circuit 110'n. When the supply voltage Vcc is in the range of 1.5–2.2 V, the Vt at the circuit 110*n* of FIG. 2*b* may be approximately 3 V. In one example, the N-well biasing of the circuit 100' may reduce the Vt at the stage 110'*n* to less than 1 V.

Figure 4:
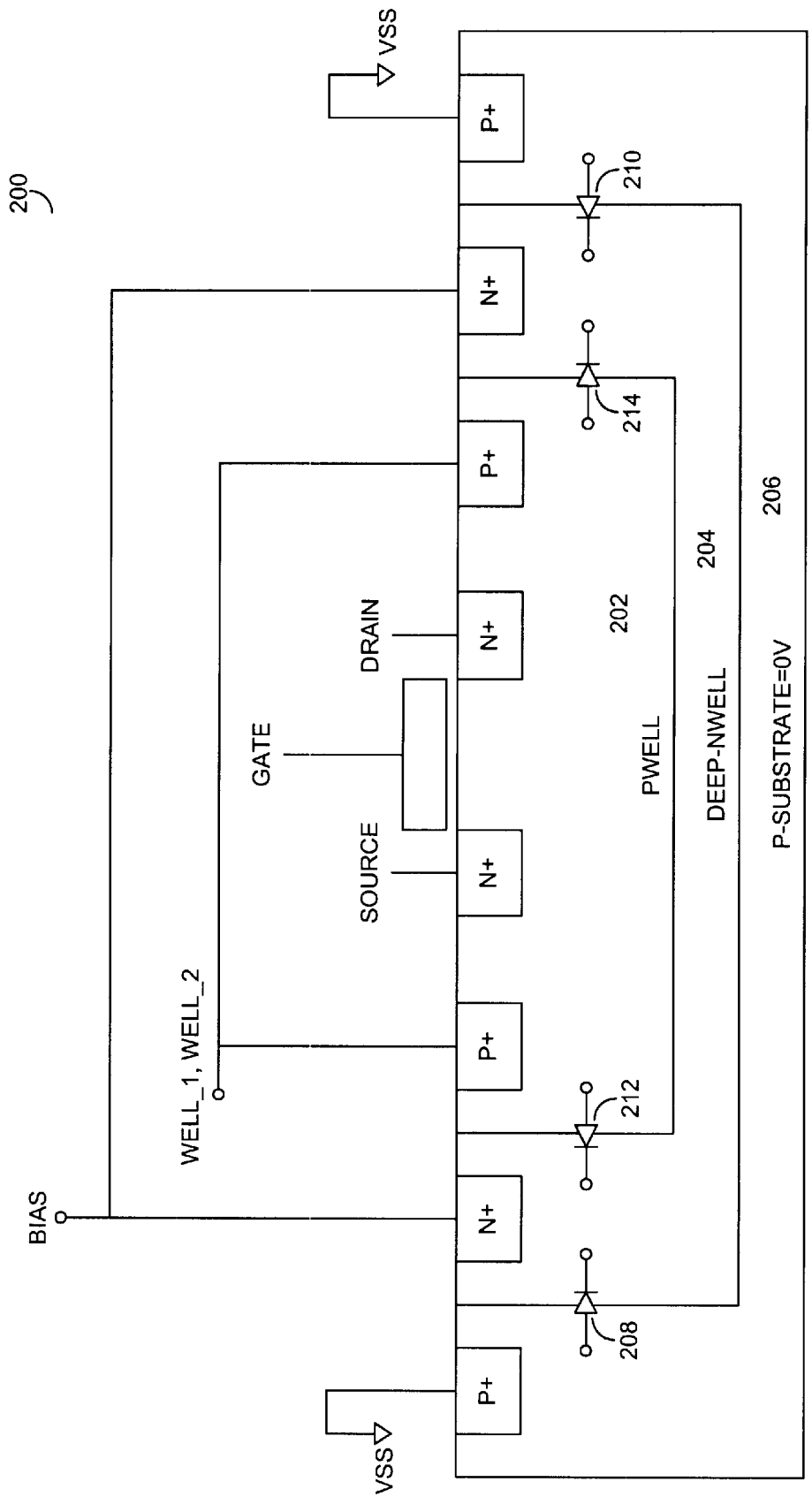
FIG. 4 is a diagram illustrating a deep N-well NMOS transistor.

Referring to FIG. 4, a cross-section of a deep N-well NMOS transistor 200 is shown. The transistor 200 may have a P-well region 202 that may receive a bias signal (e.g., WELL_1 and WELL_2), a deep N-well region 204 that may receive a bias signal (e.g., BIAS), and a P-substrate region 206 that may be connected to the supply ground Vss. Diodes 208 and 210 may be formed at the junctions between the deep N-well region 204 and the P-substrate region 206. Diodes 212 and 214 may be formed at the junctions between the P-well region 202 and the deep N-well region 204.

When a source, a gate and a drain of the transistor 200 are presented with a negative voltage potential, the P-well region 202 must be biased (e.g., the signals WELL_1 and WELL_2 must have values) to the lower of the source and the drain voltages. To prevent forward bias of the P-well region 202 to the deep N-well region 204, the signal BIAS may be a constant positive voltage in the range 0.5V to Vcc (e.g., Vcc may equal 2V). In one example, the signal BIAS may be 500 mV. The P-substrate region 206 may be connected to the ground potential Vss. The bias at the deep N-well region 204 (e.g., the signal BIAS) may be greater than the bias at the P-well region 202 (e.g., the signals WELL_1 and WELL_2). The bias at the P-well region 202 (e.g., the signals WELL_1 and WELL_2) will generally have a negative value. The signal BIAS may be greater than the bias at the P-substrate region 206 (e.g., Vss or 0V).

When the source, gate and drain of the transistor 200 are presented with positive voltage potentials, the P-well 202 must be biased (e.g., the signals WELL_1 and WELL_2 must have values) to the lower of the source and drain voltages to prevent forward bias of the junction of the source or the drain to the P-well region 202. The diodes 212 and 214 must be reverse biased during all operating conditions. To ensure the diodes 212 and 214 are reverse biased, the deep N-well region 204 is generally biased to a voltage (e.g., the signal BIAS) that is higher than the P-well region 202 (e.g., the deep N-well region 204 is generally biased to the higher positive voltage of the source or the drain voltages). The P-substrate region 206 may be connected to the ground potential Vss. The signal BIAS may be greater than the signals WELL_1 and WELL_2. The signal BIAS may be greater than the bias at the P-substrate region 206 (e.g., Vss or 0 V).

Figure 5:
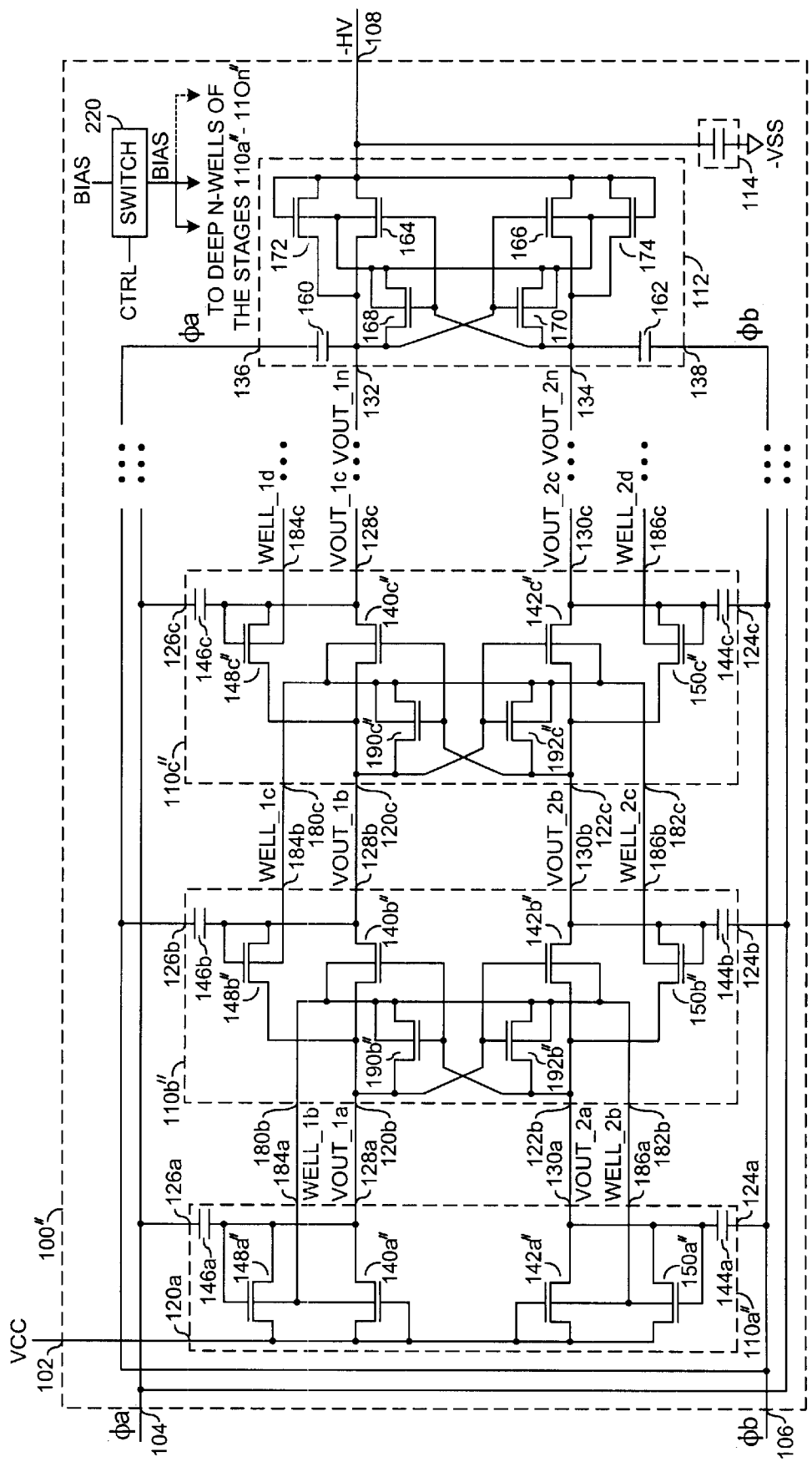
FIG. 5 is a diagram illustrating another alternative embodiment of the present invention.

Referring to FIG. 5, a circuit 100" illustrating another alternative embodiment of the circuit 100 is shown. In one example, the circuit 100" may comprise a number of circuits 110"*a*–110"*n*, the circuit 112, the circuit 114, and a circuit 220. The circuit 100" may be implemented using P-well biasing similar to the N-well biasing of the circuit 100'. However, the circuit 100" may also implement deep N-well biasing. The circuits 110" generally comprise a transistor 140", a transistor 142", a transistor 148", a transistor 150", a transistor 190", and a transistor 192". The transistors 140", 142", 148", 150", 190", and 192" may be implemented as one or more deep N-well NMOS transistors as shown in FIG. 4. The output circuit 112 may be implemented using NMOS transistors as shown in FIG. 2*b*.

In one example, the circuit 110"*a* may comprise the transistor 140"*a*, the transistor 142"*a*, the device 144*a*, the device 146*a*, the transistor 148"*a*, and the transistor 150"*a*. The ground potential Vss may be presented to a node formed by the connection of a gate and a drain of the transistor 140"*a*, a gate and a drain of the transistor 142"*a*, a drain of the transistor 148"*a*, and a drain of the transistor 150"*a*. The signal VOUT_1*a* may be presented at a node formed by the connection of a source of the transistor 140"*a*, the second terminal of the device 146*a*, and a source and a gate of the transistor 148"*a*. The signal VOUT_2*a* may be presented at a node formed by the connection of a source of the transistor 142"*a*, the second terminal of the device 144*a*, and a source and a gate of the transistor 150"*a*. The signal WELL_1*b* may be presented at P-wells of the transistors 140"*a* and 148"*a*. The signal WELL_2*b* may be presented at P-wells of the transistors 142"*a* and 150"*a*. The stages 110"*b*–110"*n* may be implemented using NMOS transistors similarly to the PMOS transistor implementation of the stages 110'*b*–110'*n* of the circuit 100 of FIG. 3.

Where a stage 110"*i* is any one of the stages 110"*b*–110"*n*, at each stage 110"*i*, the bias signals WELL_1*i* and WELL_2*i* may be generated by the transistors 190"*i* and 192"*i*. The bias signals WELL_1*i* and WELL_2*i* may bias the P-wells of the transistors 148"(i–1), 150" (i–1), 140"*i*, 142"*i*, 190"*i* and 192"*i* to the lower voltage VOUT_1 and VOUT_2 of the stage 110" (i–1). The circuit 220 may have a first input that may receive a signal (e.g., CTRL), a second input that may receive the signal BIAS, and an output that may present the signal BIAS. The circuit 220 may couple the signal BIAS to the deep N-well regions of the stages 110"*a*–110"*n* of the circuit 100" (e.g., provide constant deep N-well biasing) when the signal CTRL is asserted. The circuit 220 may be a switching circuit. When the circuit 100" is turned on, the signal CTRL may be asserted. The combination of P-well biasing and deep N-well biasing as implemented in the circuit 100" may (i) reduce body effect and (ii) minimize the threshold voltage Vt across all of the stages 110"*a*–110"*n*.

Figure 6:
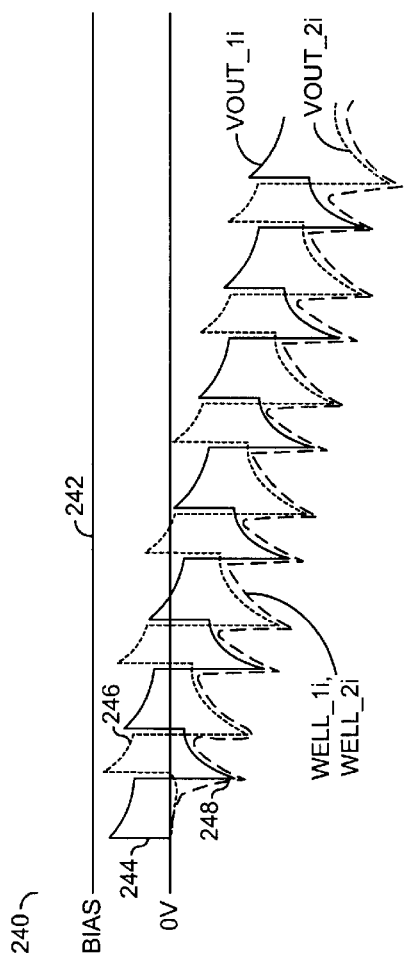
FIG. 6 is a diagram illustrating example waveforms of the circuit of FIG. 5.

Referring to FIG. 6, a diagram 240 illustrating example waveforms of the circuit 100" of FIG. 5 are shown. The diagram 240 may illustrate the voltage waveforms of a stage 110"*i* of the circuit 100" over a number of cycles of the signals φa and φb during pump down. A waveform 242 may illustrate the signal BIAS. A waveform 244 may illustrate the signal VOUT_1*i*. A waveform 246 may illustrate the signal VOUT_2*i*. A waveform 248 may illustrate the P-well bias signals WELL_1*i* and WELL_2*i*.

Figure 7:
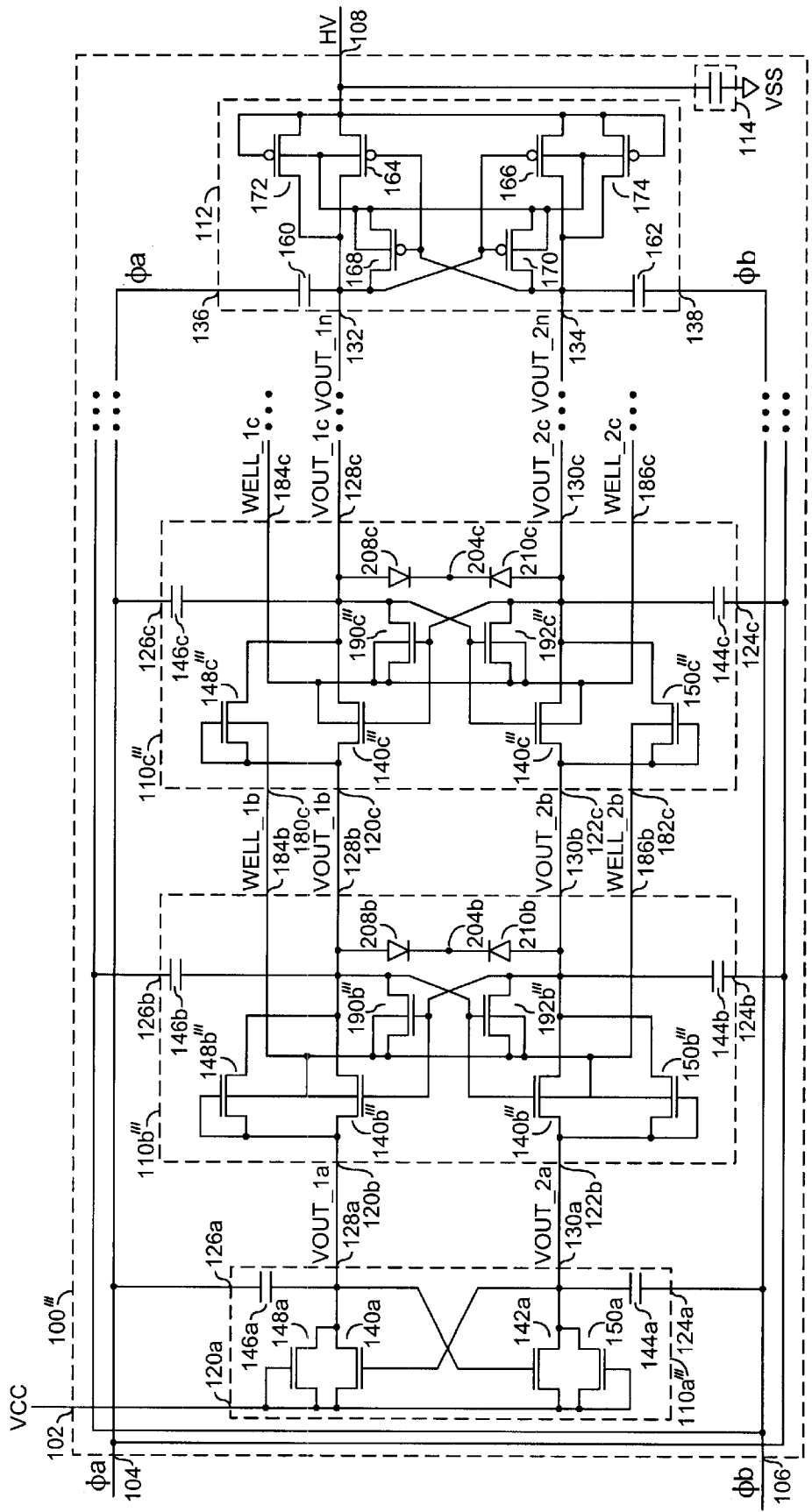
FIG. 7 is a diagram illustrating another alternative embodiment of the present invention.

Referring to FIG. 7, a circuit 100''' illustrating another alternative embodiment of the circuit 100 is shown. In one example, the circuit 100''' may comprise a number of circuits 110'''*a*–110'''*n*, the circuit 112, and the circuit 114. The circuit 100''' may be implemented using P-well biasing and deep N-well biasing. The output circuit 112 may be implemented using PMOS transistors (described in more detail in connection with FIG. 2*a*). In one example, body effect at the circuit 110'''*a* may be low. The circuit 110'''*a* may comprise the transistor 140*a*, the transistor 142*a*, the device 144*a*, the device 146*a*, the transistor 148*a*, and the transistor 150*a*. The stage 110'''*a* may be implemented similarly to the stage 110*a* of FIG. 2*a*. However, the stages 110'''*b*–110'''*n* may comprise transistors 140'''*b*–140'''*n*, transistors 142'''*b*–142'''*n*, transistors 148'''*b*–148'''*n*, transistors 150'''*b*–150'''*n*, transistors 190'''*b*–190'''*n*, transistors 192'''*b*–192'''*n*, nodes (or regions) 204*b*–204*n*, diodes 208*b*–208*n*, and diodes 210*b*–210*n* (described in more detail in connection with FIG. 4). The transistors 140'''*b*–140'''*n*, 142'''*b*–142'''*n*, 148'''*b*–148'''*n*, 150'''*b*–150'''*n*, 190'''*b*–190'''*n*, and 192'''*b*–192'''*n* may be implemented as one or more deep N-well NMOS transistors as shown in FIG. 4.

Where a stage 110'''*i* is any one of the stages 110'''*b*–110'''*n*, at the stage (or circuit) 110'''*i*, the signal VOUT_1(i–1) may be presented to a node formed by the connection of a source of the transistor 140'''i and a source and a gate of the transistor 148'''i. The signal VOUT_2(i–1) may be presented to a node formed by the connection of a source of the transistor 142'''i and a source and a gate of the transistor 150'''i. The node 204i may be the deep N-well region of the transistors 140'''i, 142'''i, 148'''i, 150'''i, 190'''i, and 192'''i.

The bias signals WELL_1i and WELL_2i may be generated by the transistors 190'''i and 192'''i. The signals WELL_1i and WELL_2i generally bias the transistors 140'''i, 142'''i, 190'''i, 192'''i, 148'''(i+1) and 150'''(i+1). However, at the stage 110'''b, the transistors 148'''b and 150'''b may be biased by the signals WELL_1b and WELL_2b. The signal WELL_1(i–1) may be presented to a P-well of the transistor 148'''i. The signal WELL_2(i–1) may be presented to a P-well of the transistor 150'''i. The signal VOUT_1i may be presented at a node formed by the connection of a drain of the transistor 140'''i, a gate of the transistor 142'''i, a drain of the transistor 148'''i, the second terminal of the device 146i, a source of the transistor 190'''i, a gate of the transistor 192'''i, and a P-region terminal of the diode 208i. The signal VOUT_2i may be presented at a node formed by the connection of a gate of the transistor 140'''i, a drain of the transistor 142'''i, the second terminal of the device 144i, a drain of the transistor 150'''i, a gate of the transistor 190'''i, a source of the transistor 192'''i, and a P-region terminal of the diode 210i. The signals WELL_1i and WELL_2i may be presented at a node formed by the connection of a P-well of the transistor 140'''i, a P-well of the transistor 142'''i, a drain and a P-well of the transistor 190'''i, and a drain and a P-well of the transistor 192'''i. The combination of P-well biasing and deep N-well biasing as implemented in the circuit 100''' may (i) reduce body effect and (ii) minimize the threshold voltage Vt across all of the stages 110'''a–110'''n.

Figure 8:
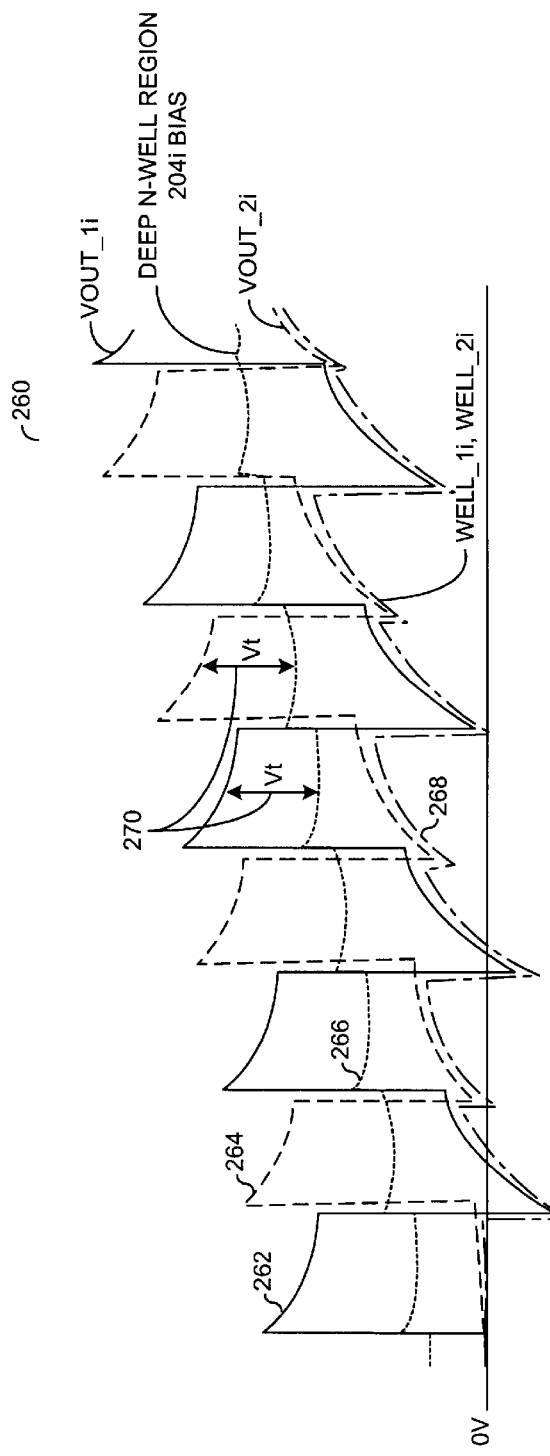
FIG. 8 is a diagram illustrating example waveforms of the circuit of FIG. 7.

Referring to FIG. 8, a diagram 260 illustrating example waveforms of the circuit 100''' of FIG. 7 is shown. The diagram 260 may illustrate the voltage waveforms of a stage 110'''i of the circuit 100''' over a number of cycles of the signals ϕa and ϕb during pump up. A waveform 262 may illustrate the signal VOUT_1i. A waveform 264 may illustrate the signal VOUT_2i. A waveform 266 may illustrate the bias voltage at the deep N-well region 204i. A waveform 268 may illustrate the P-well bias signals WELL_1i and WELL_2i. The waveforms 262 and 264 and the waveform 266 may have a difference 270. The difference 270 may be the threshold voltage Vt.

Figure 9A:
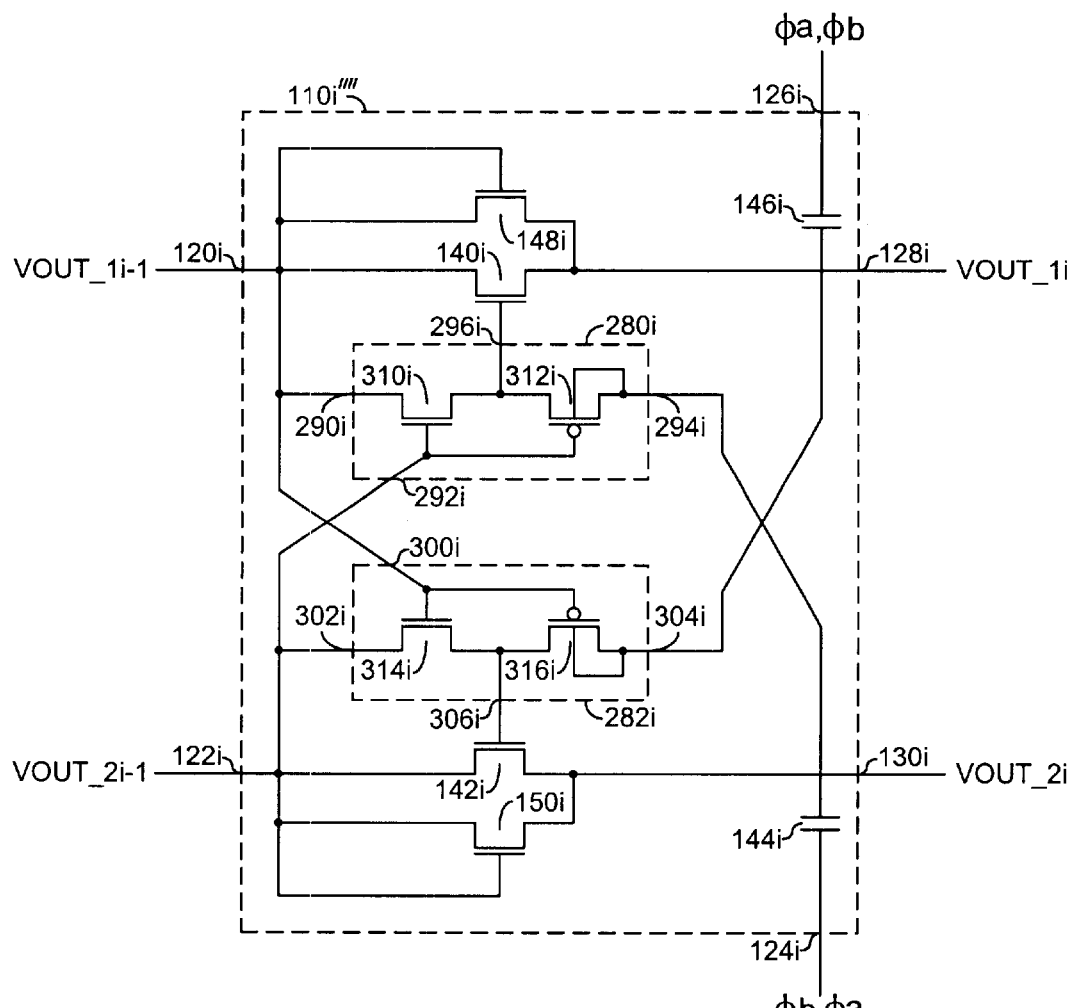
FIGS. 9a and 9b are diagrams illustrating alternative embodiments of the present invention.

Referring to FIG. 9a, a diagram of a stage 110'''' illustrating an alternative embodiment of a stage 110 of FIG. 2a is shown. The stage 110'''' may be implemented similarly to the stage 110 of FIG. 2a except each stage 110 may further comprise a circuit 280 and a circuit 282. The circuits 280 and 282 may be, in one example, backflow control switch circuits. The circuit 110'''' may be implemented when (i) a relatively high supply voltage is used (e.g., Vcc>5V) and/or (ii) the voltage per stage is much greater than the transistor threshold voltage (e.g., Vstage>>Vt). When the stages 110''''a–110''''n are implemented with the circuits 280 and 282, the signals ϕa and ϕb are implemented as non-overlapping signals (described in more detail in connection with FIG. 10a).

Where a stage 110''''i is any one of the stages 110''''a–110''''n, at the stage 110''''i the circuit 280i may have an input 290i that may receive the signal VOUT_1(i–1), an input 292i that may receive the signal VOUT_2 (i–1), an input 294i that may receive the signal VOUT_2i, and an output 296i that may be connected to the gate of the transistor 140i. The circuit 280i may comprise, in one example, a transistor 310i and a transistor 312i. In one example, the transistor 310i may be an NMOS transistor and the transistor 312i may be a PMOS transistor. The transistors 310i and 312i may be pass transistors. The transistor 310i may have a drain that may receive the signal VOUT_1(i–1), a gate that may receive the signal VOUT_2(i–1), and a source that may be connected to the gate of the transistor 140i. The transistor 312i may have a source that may be connected to the gate of the transistor 140i, a gate that may receive the signal VOUT_2(i–1) and a drain and an N-well that may receive the signal VOUT_2i.

The circuit 282i may have an input 300i that may receive the signal VOUT_1(i–1), an input 302i that may receive the signal VOUT_2(i–1), an input 304i that may receive the signal VOUT_1i, and an output 306i that may be connected to the gate of the transistor 142i. The circuit 282i may comprise, in one example, a transistor 314i and a transistor 316i. In one example, the transistor 314i may be an NMOS transistor and the transistor 316i may be a PMOS transistor. The transistors 314i and 316i may be pass transistors. The transistor 314i may have a gate that may receive the signal VOUT_1(i–1), a drain that may receive the signal VOUT_2(i–1), and a source that may be connected to the gate of the transistor 142i. The transistor 316i may have a source that may be connected to the gate of the transistor 142i, a gate that may receive the signal VOUT_1(i–1) and a drain and an N-well that may receive the signal VOUT_1i. During an example operation of the circuit 100'''', the backflow control switch circuits 280i and 282i may prevent the charge that may be pumped at the stage 110i from flowing back to stage 110(i–1) when the signals ϕa and ϕb are cycled.

Figure 9B:
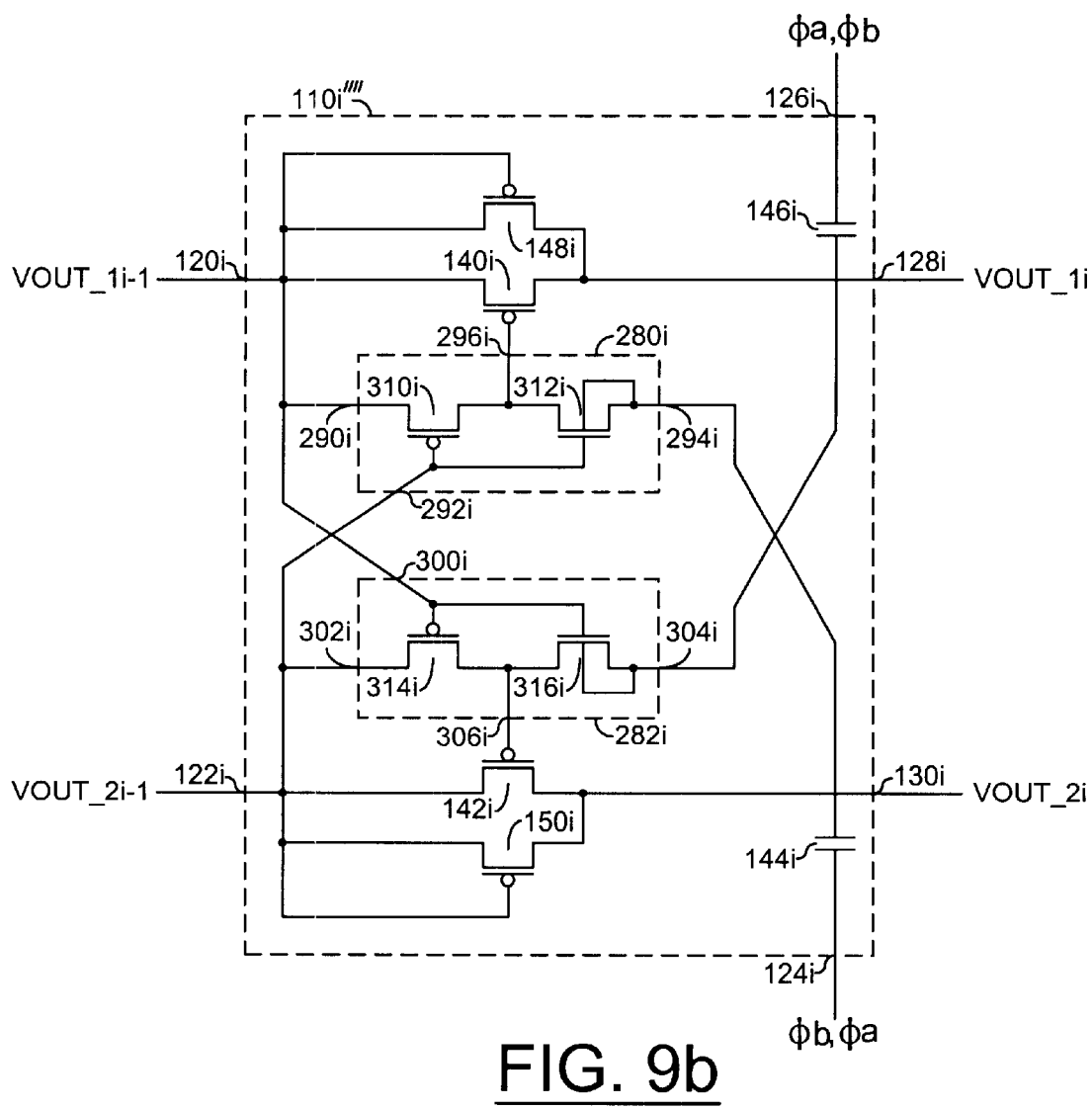

Referring to FIG. 9b, a PMOS transistor embodiment of the stage 110'''' is shown. The transistors 140, 142, 148, 150, 310 and 314 may be implemented as one or more PMOS transistors. The transistors 312 and 316 may be implemented as NMOS transistors. When the stage 110'''' is implemented with PMOS transistors, the circuit 100 may (i) be connected to Vss at the input 102 and (ii) generate the high negative voltage output –HV.

Figure 10A:
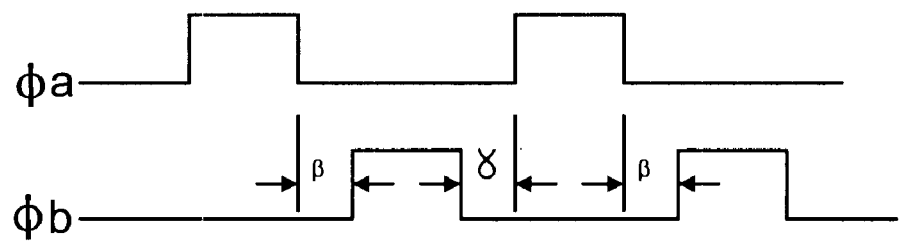

Referring to FIG. 10a, a diagram illustrating example waveforms of NMOS transistor implementations of the circuit 110 is shown (e.g., FIGS. 2a, 5, 7, and 9a). The signals ϕa and ϕb generally have non-overlapping logical HIGH states. A delay β may occur between the trailing edge of the signal ϕa and the rising edge of the signal ϕb. A delay γ may occur between the trailing edge of the signal ϕb and the rising edge of the signal ϕa. In one example, the delays β and γ may be equal. However, the delays β and γ may have different durations.

Figure 10B:
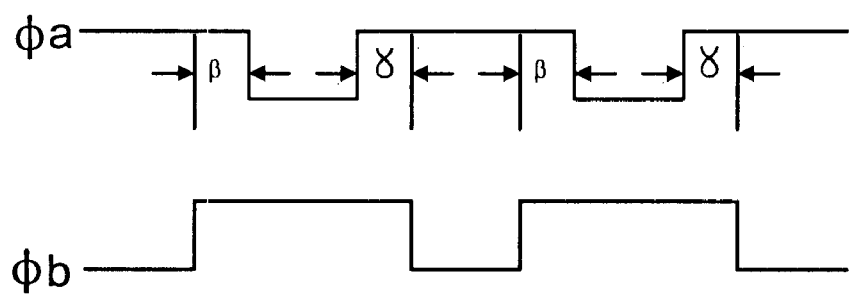
FIG. 10b is a diagram illustrating example waveforms of the circuits of FIGS. 2b, 3, and 9b.

Referring to FIG. 10b, a diagram illustrating example waveforms of PMOS transistor implementations of the circuit 110 is shown (e.g., FIGS. 2b, 3, and 9b). The signals ϕa and ϕb generally have non-overlapping logical LOW states. A delay β may occur between the rising edge of the signal ϕb and the trailing edge of the signal ϕa. A delay γ may occur between the rising edge of the signal ϕa and the trailing edge of the signal ϕb. In one example, the delays β and γ may be equal. However, the delays β and γ may have different durations.

Figure 11A:
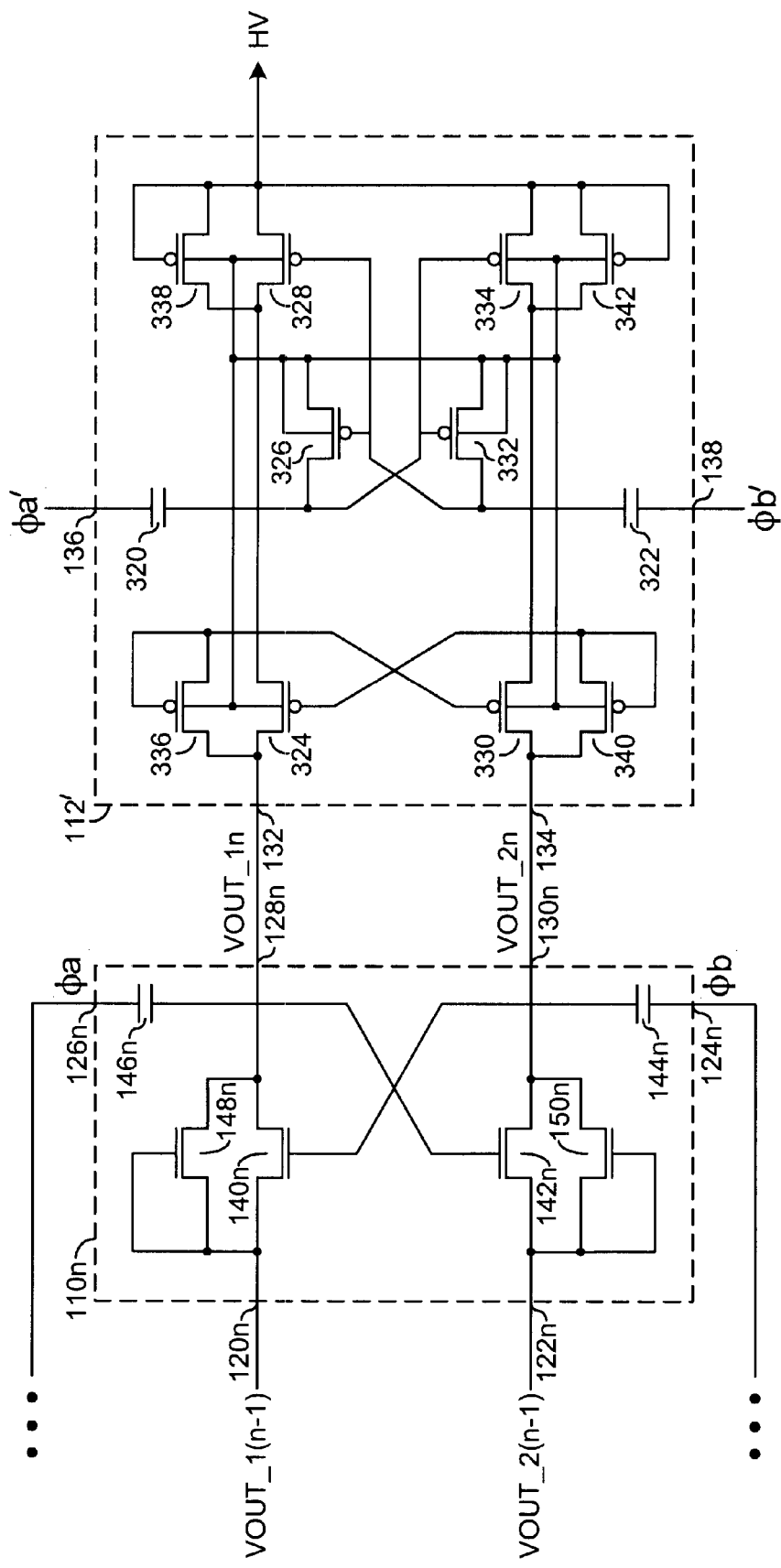
FIGS. 11a and 11b are diagrams of alternative embodiments of an output circuit of the present invention.

Referring to FIG. 11a, a detailed diagram of a circuit 112' illustrating an alternative embodiment of the present invention is shown. The circuit 112' may be, in one example, a PMOS output driver circuit. In one example, the circuit 112' may be implemented with one or more NMOS charge pump stages (e.g., the stages 110a–110n of FIG. 2a) in a positive high voltage charge pump circuit 100. However, any suitable charge pump stages may be implemented to meet the design criteria of a particular application. The circuit 112' may have an input 136 that may receive a signal (e.g., φa') and an input 138 that may receive a signal (e.g., φb'). The signals φa' and φb' are described in more detail in connection with FIG. 12. The stages 110a–110n may receive the clock signal inputs φa and φb. The circuit 112' may comprise a device 320, a device 322, a transistor 324, a transistor 326, a transistor 328, a transistor 330, a transistor 332, a transistor 334, a transistor 336, a transistor 338, a transistor 340, and a transistor 342. The devices 320 and 322 may be implemented as capacitors. In another example, the devices 320 and 322 may be implemented as transistors configured as capacitors. The transistors 324, 326, 328, 330, 332, 334, 336, 338, 340, and 342 may be implemented as one or more PMOS transistors.

The device 320 may have a first terminal that may receive the signal φa' and a second terminal that may be connected to a node formed by the connection of a drain of the transistor 324, a source of the transistor 326, a source of the transistor 328, a gate of the transistor 330, a gate of the transistor 332, a gate of the transistor 334, a gate and a drain of the transistor 336, and a source of the transistor 338. The device 322 may have a first terminal that may receive the signal φb' and a second terminal that may be connected to a node formed by the connection of a gate of the transistor 324, a gate of the transistor 326, a gate of the transistor 328, a drain of the transistor 330, a source of the transistor 332, a source of the transistor 334, a gate and a drain of the transistor 340, and a source of the transistor 342.

The signal VOUT_1n may be presented to a source of the transistor 324 and a source of the transistor 336. The signal VOUT_2n may be presented to a source of the transistor 330 and a source of the transistor 340. The signal HV may be presented at a node formed by the connection of a drain of the transistor 328, a drain of the transistor 334, a gate and a drain of the transistor 338, and a gate and a drain of the transistor 342. A node may be formed by the connection of N-wells of the transistors 324, 326, 328, 330, 332, 334, 336, 338, 340, and 342, a drain of the transistor 326, and a drain of the transistor 332.

The transistors 324 and 330 may be isolation transistors. The isolation transistors 324 and 330 may prevent the circuit 112' and the stage 110n from turning on at the same time (e.g., when the signals φa and φb overlap at a logical LOW state). The transistors 336, 338, 340, and 342 may be configured as diodes. The transistors 336, 338, 340, and 342 may be sized smaller than the transistors 324, 328, 330, and 334, respectively. The transistors 336, 338, 340, and 342 may have a width 25% to 33% of the width of the transistors 324, 328, 330, and 334, respectively. The transistors 336, 338, 340, and 342 may be configured to (i) set up the initial conditions and (ii) provide a final discharge path of the circuit 112' as previously described in connection with the transistors 148 and 150 of the circuit 110.

Figure 11B:
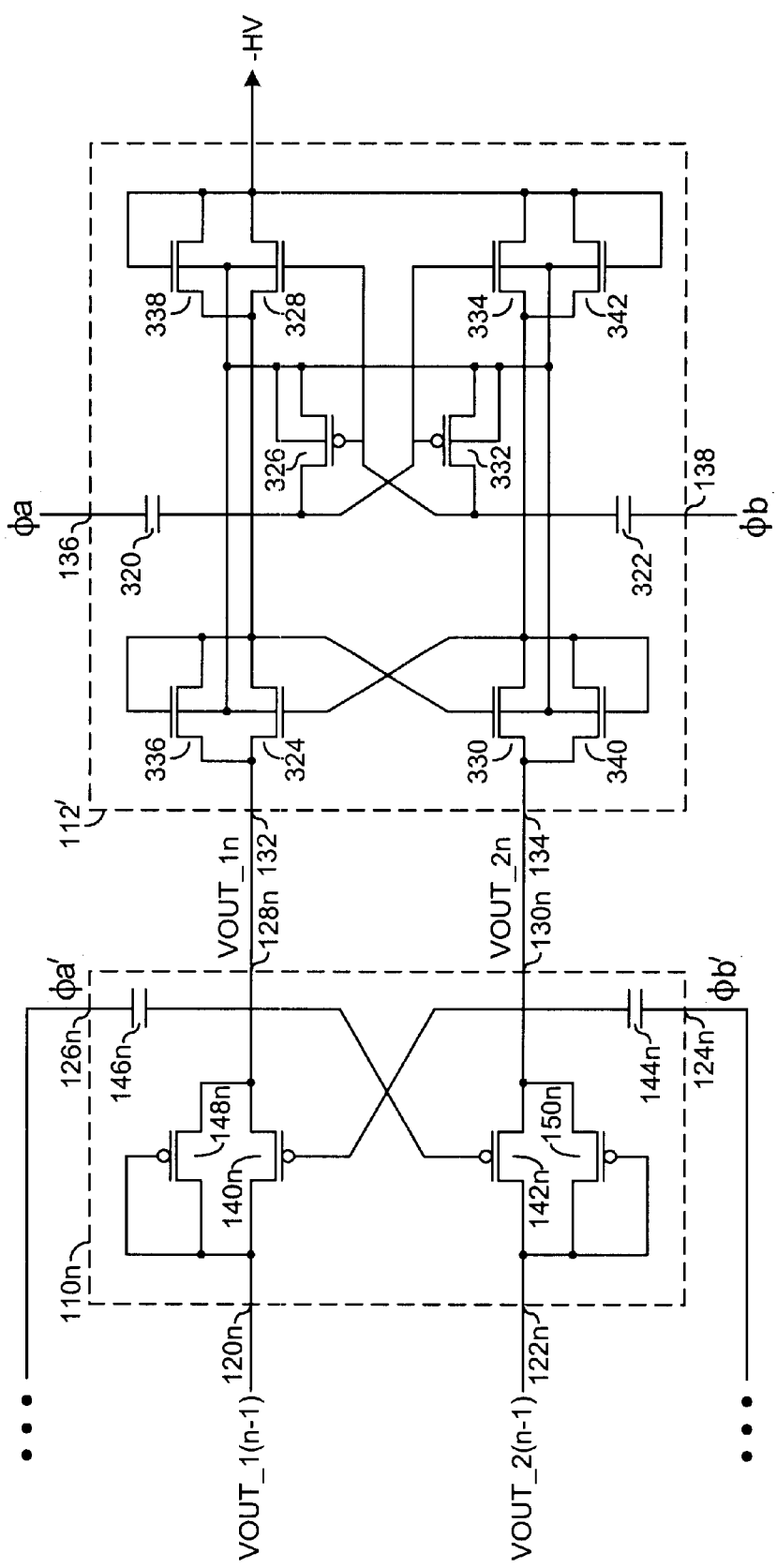

Referring to FIG. 11b, an NMOS transistor implementation of the circuit 112' is shown. The transistors 324, 326, 328, 330, 332, 334, 336, 338, 340, and 342 may be implemented as one or more NMOS transistors. The input 136 may receive the signal φa and the input 138 may receive the signal φb (e.g., the clock signal inputs to the circuit 112' may have overlapping logical LOW states). When the circuit 112' is implemented with NMOS transistors and the stages 110a–110n are implemented with PMOS transistors, the stages 110a–110n may receive the signals φa' and φb' (e.g., the clock signal inputs to the stages 110a–110n may have overlapping logical HIGH states). The circuit 100 may (i) be connected to Vss at the input 102 and (ii) generate the high negative voltage output –HV.

Figure 12:
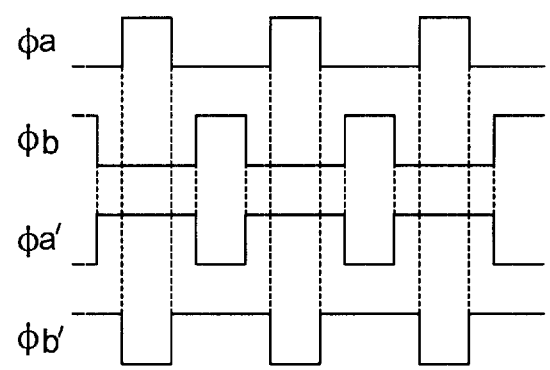
FIG. 12 is a diagram illustrating example waveforms of the output circuits of FIGS. 11a–11b.

Referring to FIG. 12, a diagram illustrating example waveforms of the signals φa, φb, φa', and φb' is shown. The signal φa' may be the digital complement of the signal φb' and the signal φb' may be the digital complement of the signal φa. In one example, the signals φa' and φb' may have non-overlapping logical LOW states. In another example, the signals φa' and φb' may have overlapping logical LOW states (not shown).

Figure 13:
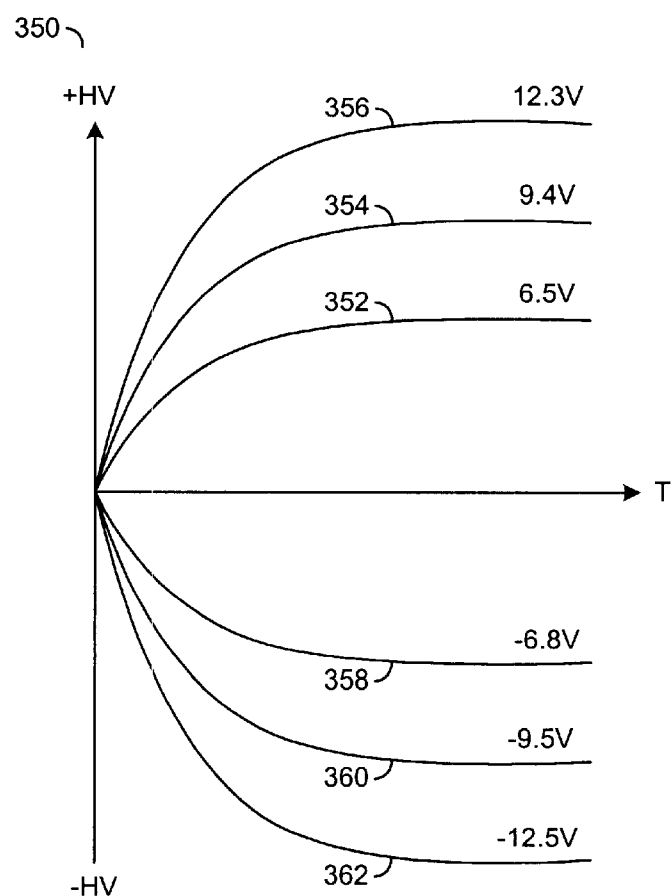
FIG. 13 is a diagram illustrating example waveforms of the circuits of FIGS. 1a, 1b, 2a and 2b.

Referring to FIG. 13, a diagram 350 illustrating example waveforms comparing the output of conventional charge pump circuits 10 and 20 and the circuit 100 of the present invention is shown. Waveforms 352, 354, and 356 are 10-stage NMOS charge pump circuit output voltage simulation waveforms when Vcc=2.2 V. Waveforms 358, 360, and 362 are 12-stage PMOS charge pump circuit output voltage simulation waveforms when Vcc=–2.2 V.

The waveform 352 may be a voltage waveform of an NMOS transistor implementation of the conventional charge pump circuit 10. The waveform 354 may be a voltage waveform of an NMOS transistor implementation of the conventional charge pump circuit 20. The waveform 356 may be a voltage waveform of the circuit 100 of the present invention when ten of the charge pump stages 110 are implemented using NMOS transistors. The waveform 358 may be a voltage waveform of a PMOS transistor implementation of the conventional charge pump circuit 10. The waveform 360 may be a voltage waveform of a PMOS transistor implementation of the conventional charge pump circuit 20. The waveform 362 may be a voltage waveform of the circuit 100 of the present invention when twelve of the charge pump stages 110 are implemented using PMOS transistors. When the circuit 100 is implemented as shown in FIGS. 2a, 2b, 3, 5 and 7, the circuit 100 may operate with the supply voltage Vcc in the range of 1.5–3V. Alternatively, when the circuit 100 is implemented as shown in FIGS. 6 and 8, the circuit 100 may operate with the supply voltage Vcc in the range of 3–5V.

The various signals of the present invention are generally "on" (e.g., a digital HIGH, or 1) or "off" (e.g., a digital LOW, or 0). However the particular polarities of the on (e.g., asserted) and off (e.g., de-asserted) states of the signals may be adjusted (e.g., reversed) accordingly to meet the design criteria of a particular implementation.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a cross-coupled charge pump circuit configured to generate an output voltage in response to (i) a supply voltage, (ii) a first signal, and (iii) a second signal, wherein (A) said output voltage has a greater magnitude than said supply voltage and (B) said charge pump circuit comprises a plurality of directly serially connected charge pump stages comprising (a) first and second cross-coupled pump transistors each having a respective diode-connected transistor connected in parallel across a source and a drain and (b) a first bias transistor cross-coupled with a second bias transistor and said bias transistors are configured to bias wells of (i) said first and second pump transistors and (ii) said diode-connected transistors of an adjacent charge pump stage.

2. The apparatus according to claim 1, wherein said charge pump circuit further comprises:
a driver circuit (i) serially connected to a last one of said serially connected charge pump stages and (ii) configured to present said output voltage.

3. The apparatus according to claim 1, wherein said first and second signals comprise complementary clock signals.

4. The apparatus according to claim 2, wherein each of said charge pump stages comprise:
a first capacitor configured to receive said first signal at a first terminal;
a second capacitor configured to receive said second signal at a first terminal;
a first input coupled to a first source/drain of said first pump transistor;
a second input coupled to a first source/drain of said second pump transistor;
a first output coupled to (i) a second terminal of said first capacitor, (ii) a second source/drain of said first pump transistor, and (iii) a gate of said second pump transistor; and
a second output coupled to (i) a second terminal of said second capacitor, (ii) a second source/drain of said second pump transistor, and (iii) a gate of said first pump transistor.

5. The apparatus according to claim 4, wherein a first one of said pump stages receives said supply voltage at said first and second inputs.

6. The apparatus according to claim 5, wherein said first output is coupled to said first input of a next one of said pump stages and said second output is coupled to said second input of said next one of said pump stages.

7. The apparatus according to claim 6, wherein a last of said pump stages is configured to couple said first output to a first input of said driver circuit and said second output to a second input of said driver circuit.

8. The apparatus according to claim 4, wherein said diode-connected transistors comprise:
a third transistor having a first source/drain connected to said first input and a second source/drain connected to said first output; and
a fourth transistor having a first source/drain connected to said second input and a second source/drain connected to said second output.

9. The apparatus according to claim 8, wherein said third and fourth transistors are sized in the range of 25% to 33% of the size of said first and second transistors.

10. The apparatus according to claim 8, wherein one or more of said pump stages further comprises:
said first bias transistor having a first source/drain connected to said first input, a gate connected to said gate of said first pump transistor, and a second source/drain and a well connected to (i) a well of said third transistor and a well of said fourth transistor of another one of said pump stages, (ii) a well of said first pump transistor and (iii) a well of said second pump transistor; and
said second bias transistor having a first source/drain connected to said second input, a gate connected to said gate of said second pump transistor, and a second source/drain and a well connected to (i) said well of said third transistor and said well of said fourth transistor of said another one of said pump stages, (ii) said well of said first pump transistor and (iii) said well of said second pump transistor.

11. The apparatus according to claim 10, wherein said first and second bias transistors are sized in the range of 20% to 40% of the size of said first and second pump transistors.

12. The apparatus according to claim 10, wherein said apparatus further comprises a switch circuit configured to provide a constant bias to a deep well region of each of said pump stages in response to an enable signal.

13. The apparatus according to claim 10, wherein each of said pump stages further comprises a deep well region having a first P-region terminal connected to said first output and a second P-region terminal connected to said second output.

14. The apparatus according to claim 4, wherein each of said pump stages further comprises:
a first switch circuit coupled to said first input, said second input, said second output, and the gate of said first pump transistor; and
a second switch circuit coupled to said first input, said second input, said first output, and a gate of said second pump transistor.

15. The apparatus according to claim 14, wherein said switch circuits further comprise one or more NMOS transistors and one or more PMOS transistor configured as pass transistors.

16. The apparatus of claim 4, wherein said driver circuit further comprises:
a first driver capacitor configured to receive a third signal;
a second driver capacitor configured to receive a fourth signal;
a first driver transistor cross-coupled with a second driver transistor, wherein said first driver transistor is coupled to said first driver capacitor and said second driver transistor is coupled to said second driver capacitor; and
a first isolation transistor cross-coupled to a second isolation transistor.

17. The apparatus according to claim 16, wherein said apparatus further comprises a first driver bias transistor cross-coupled with a second driver bias transistor, wherein said first and second driver bias transistors are configured to generate well bias for said first and second driver transistors and said first and second isolation transistors.

18. The apparatus according to claim 16, wherein said third signal is a digital complement of said first signal and said fourth signal is a digital complement of said second signal.

19. An apparatus for generating an output voltage having a greater magnitude than a supply voltage comprising:
first means for pumping a first charge in response to a first signal, a second signal, and said supply voltage, wherein said first pumping means comprises a first pumping transistor having a drain and source connected in parallel with a first diode-connected transistor;
second means for pumping a second charge in response to said first and second signals and said supply voltage, wherein said second pumping means comprises a second pumping transistor having a drain and source connected in parallel with a second diode-connected transistor;
means for cross-coupling and directly serially connecting a plurality of said first and second charge pumping means; and
means for cross-coupling a first bias transistor with a second bias transistor, wherein said bias transistors are configured to bias wells of (i) said first and second pump transistors and (ii) said diode-connected transistors of an adjacent charge pump stage.

20. A method for generating an output voltage having a greater magnitude than a supply voltage comprising the steps of:

(A) generating a first output in response to (i) a first input and a second input and (ii) a first clock and a second clock, wherein said first generator comprises a first pumping transistor having a drain and source connected in parallel with a first diode-connected transistor;

(B) generating a second output in response to (i) said first and second inputs and (ii) said first and a second clocks, wherein said second generator comprises a second pumping transistor having a drain and source connected in parallel with a second diode-connected transistor;

(C) cross-coupling and directly serially connecting a plurality of said first and second output generators to generate said output voltage; and (D) cross-coupling a first bias transistor with a second bias transistor, wherein said bias transistors are configured to bias wells of (i) said first and second pump transistors and (ii) said diode-connected transistors of an adjacent charge pump stage.

21. The apparatus according to claim 1, wherein said one or more of said charge pump stages bias said first and second pump transistors and said diode-connected transistors of said adjacent charge pump stage via a well bias signal having a higher magnitude.

22. An apparatus comprising:

a cross-coupled charge pump circuit configured to generate an output voltage in response to (i) a supply voltage, (ii) a first signal, and (iii) a second signal, wherein (a) said output voltage has a greater magnitude than said supply voltage and (b) said charge pump circuit comprises a plurality of serially connected charge pump stages (i) comprising first and second cross-coupled transistors, first and second switch circuits coupled to a respective gate of said first and second transistors and a first source/drain of each of said first and second transistors, and (ii) configured to control backflow between said charge pump stages.

23. An apparatus comprising:

a cross-coupled charge pump circuit configured to generate an output voltage in response to (i) a supply voltage, (ii) a first signal, and (iii) a second signal, wherein (a) said output voltage has a greater magnitude than said supply voltage and (b) said charge pump circuit comprises a driver circuit (i) configured to present said output voltage and (ii) comprising a first driver transistor cross-coupled with a second driver transistor, a first isolation transistor cross-coupled with a second isolation transistor, and a first bias transistor cross-coupled with a second bias transistor, wherein said bias transistors are configured to bias wells of said driver and said isolation transistors.

* * * * *